Nov. 22, 1932.   R. MAYNE   1,888,356
APPARATUS FOR SHAPING SHEET MATERIAL
Filed Sept. 18, 1930   2 Sheets-Sheet 1
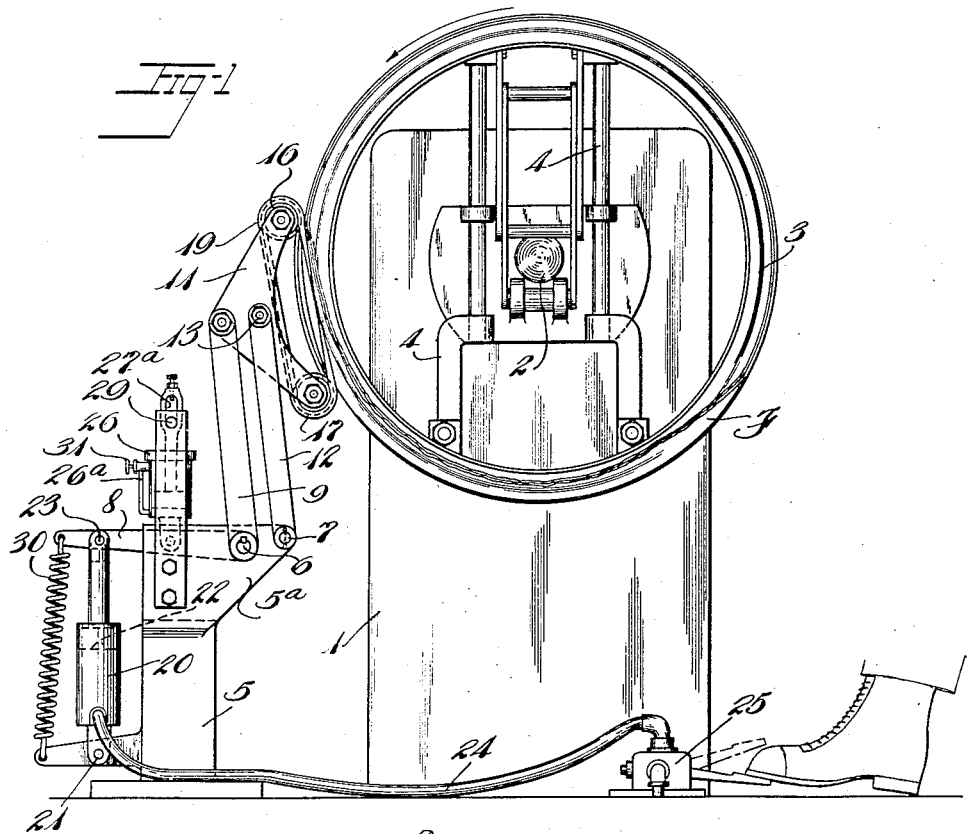
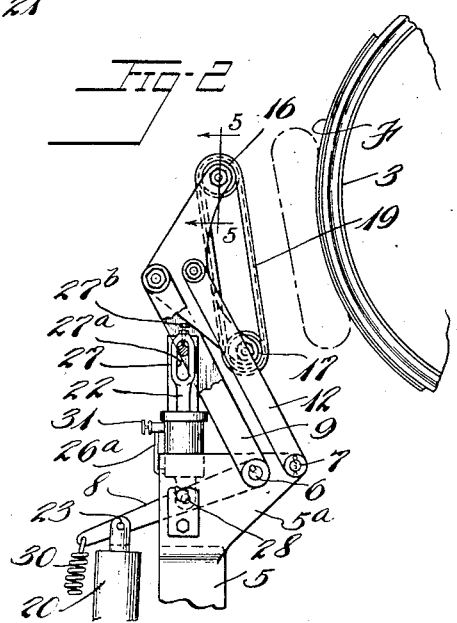
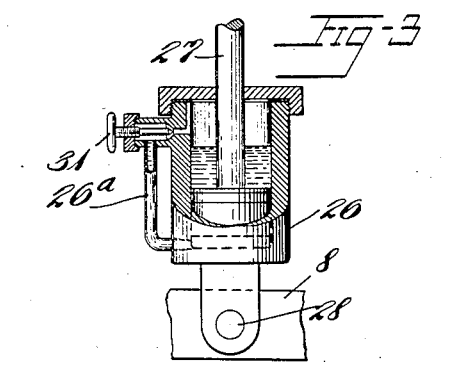
Inventor
Robert Mayne
By Eakin & Avery
Attys

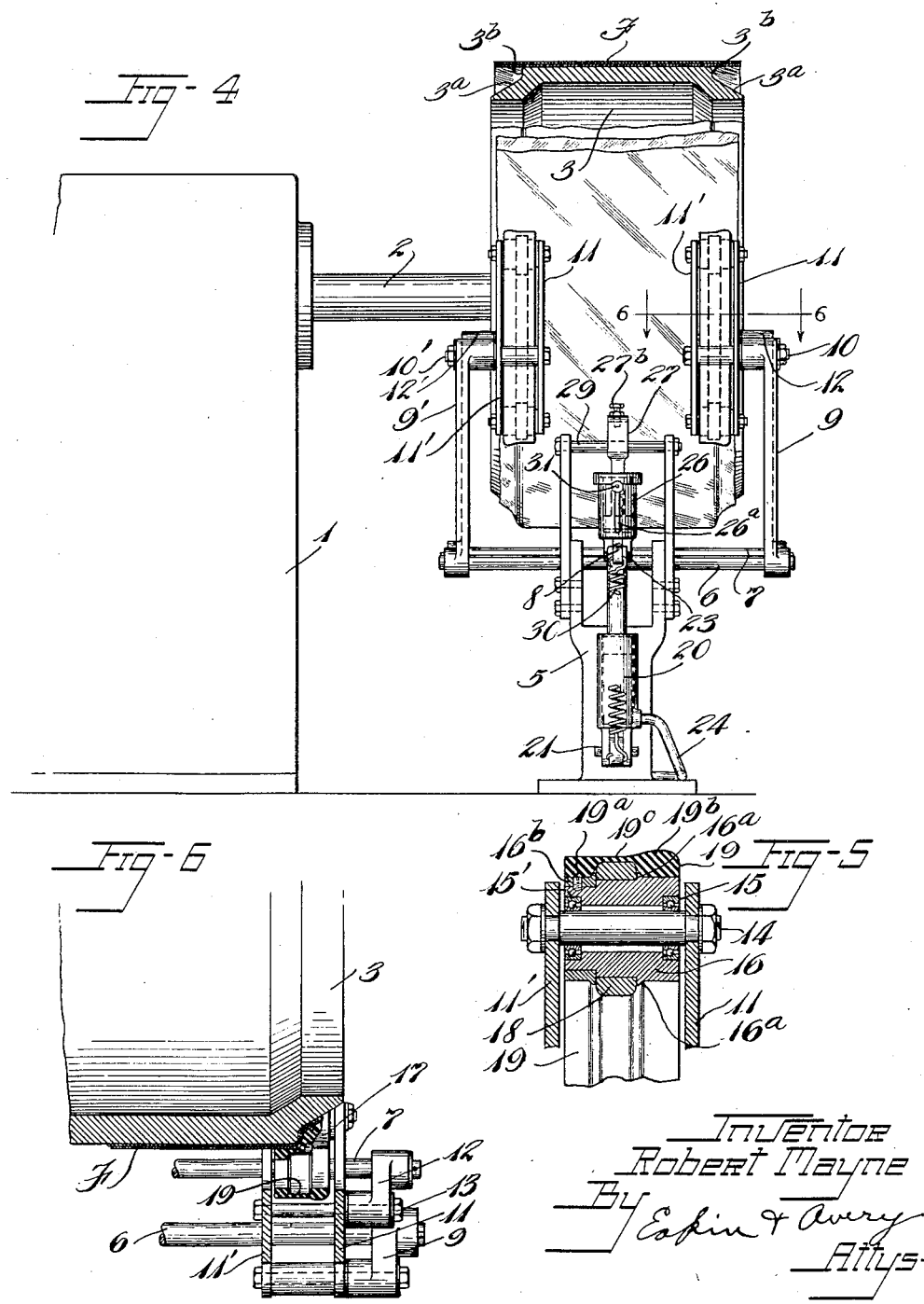

Patented Nov. 22, 1932

1,888,356

UNITED STATES PATENT OFFICE

ROBERT MAYNE, OF AKRON, OHIO, ASSIGNOR TO THE B. F. GOODRICH COMPANY, OF NEW YORK, N. Y., A CORPORATION OF NEW YORK

APPARATUS FOR SHAPING SHEET MATERIAL

Application filed September 16, 1930. Serial No. 482,750.

My invention relates to apparatus for shaping sheet material about rotatable forms, and more particularly to an apparatus for shaping vulcanizable materials such as rubber-coated fabric about rotatable forms in the manufacture of tires and similar articles.

The invention is particularly applicable to the building of pneumatic tire casings by the drum-building method wherein one or more plies of vulcanizable rubber-coated fabric or cords are assembled about a revoluble drum provided with shouldered, reduced margins upon which the fabric must be smoothly shaped, whereupon bead cores are positioned thereon and other plies of material are applied over the bead cores.

One of the objects of the invention is to produce a better article, especially an article of greater uniformity, by eliminating defects and securing better adhesion. Another object is to lower the cost of manufacture of the article by reducing the time and effort of the operator.

Another object is to increase production by simplifying the operation and thereby reducing the building time.

Other objects will appear from the following description of my invention.

In the drawings, which illustrate the use of my invention in the building of tire casings:

Fig. 1 is an end elevation of a drum tire-building machine showing the apparatus of my invention as it appears when co-operating with the drum.

Fig. 2 is a similar fragmentary view showing the position of my apparatus when retracted from the drum.

Fig. 3 is a detail view, partly in section, of the checking mechanism.

Fig. 4 is a side elevation of the machine as viewed from the left of Fig. 1.

Fig. 5 is a fragmentary section on line 5—5 of Fig. 2, and

Fig. 6 is a fragmentary horizontal section on line 6—6 of Fig. 4.

The apparatus of my invention comprises a pair of elastic rubber belts which are supported adjacent to the rotating form or drum on which the sheet material is to be shaped and mechanism for causing the belts, which are mounted on spaced supporting pulleys, to be moved toward and from the drum. The drum drives the belts by frictional contact and as the belts approach the drum the reaches of the belts conform to the drum along an arcuate contact area of considerable extent and are progressively deformed to cause a progressive shaping of the fabric laterally around the shoulders of the drum. Only a short period of operation is necessary to thoroughly compact the plies of fabric against the form, as the long arcuate area of contact assures such continuation of the pressure on a given part of the work for an appreciable time in each revolution of the drum as to cause air to be driven from between the plies and provide improved adhesion. By means of a checking device the approach of the belts toward the drum is controlled so as to shape the material to the shoulders of the form by progression laterally of the form.

In the drawings, the numeral 1 indicates conventionally the driving unit of a tire-building machine, from which extends a spindle 2, adapted to support and rotate the building drum 3 in any suitable manner. The drum 3 is ordinarily of the collapsible type and is supported on the spindle 2 by automatically collapsible mechanism indicated by the numeral 4 in Fig. 1, but forming no essential part of this invention. The driving unit is adapted to revolve the spindle 2 as desired. The drum 3 is formed with reduced end portions $3^a$, joined to the main portion by shoulders $3^b$, said end portions and said shoulders constituting surfaces adapted to align and support annular bead cores.

The first step in the operation of building a tire by the drum process is to apply one or more layers or plies of fabric or cords to the cylindrical portion of the drum. These may be applied in any well-known manner and in the drawings such fabric is indicated by the letter F. The next operation consists in forming the fabric to conform smoothly to the shoulders $3^b$ and reduced portions $3^a$ and this step may be referred to as the under-bead forming operation.

With the apparatus and methods heretofore proposed it has been customary to accomplish the performance of the under-bead forming operation on one edge at a time and by means of rollers and stitching tools either manually held or manually controlled.

My present invention contemplates the automatic simultaneous forming of both edges of the fabric and for this purpose I provide the following mechanism. Mounted in close proximity to the drive 1, is a fixed support 5 provided with parallel bearing extensions 5$^a$ having bearings for supporting a pair of parallel horizontal shafts 6 and 7 journaled therein. Shafts 6 and 7 extend laterally at both sides of the member 5. Shaft 6 has keyed thereto centrally thereof one end of a lever 8 extending in a substantially horizontal direction; and the lateral extensions of shaft 6 are provided with keyways for fastening a pair of levers 9, 9' thereto. Levers 9, 9' are provided at their upper extremities with inwardly projecting studs 10, 10' on each of which are pivoted a pair of spaced brackets 11, 11'. Shaft 7 supports at its ends a pair of links 12, 12' equal in length to levers 9, 9', and having their upper extremities pivoted at 13 to brackets 11.

Brackets 11, 11' carry at their upper extremities a spacing stud 14 provided with ball-bearings 15 and 15' on which is mounted a free-running pulley 16. A similar pulley 17 is similarly supported at the lower extremities of brackets 11, 11'. The pulleys 16 and 17 are each provided with a freely rotatable ring 18 centrally mounted thereon and retained by a fixed shoulder 16$^a$ at one side thereof and a removable collar 16$^b$ at the other side fixed to the pulley. The ring 18 may therefore rotate at a higher velocity than pulley 16 for a purpose hereinafter described. An elastic belt 19, formed of vulcanized rubber composition and comprising thickened side portions 19$^a$, 19$^b$, and a relatively thin connecting web 19$^c$, is mounted on pulleys 16 and 17 with its thin central web spanning the rings 18, the belt 19 being channeled on its underside for such purpose, whereby the belt is held in alignment and also acts in a manner to be hereinafter described. It will be understood that a similar belt is similarly mounted on each of the arms 9 and 9'.

For the purpose of moving the belts 19 into operative relation to the building drum 3, I provide a single acting air cylinder 20, mounted on the support 5 by a pivotal connection 21, and provided with a piston 22 pivoted at 23 to lever arm 8. Compressed air is furnished to cylinder 20 by means of a pipe 24 from a suitable source of supply, controlled by a foot-operated valve 25, located in convenient position for manipulation by the operator at will. Belts 19 are so aligned with shoulders 3$^b$ of the building drum that when moved by the air pressure from the inoperative position shown in Fig. 2 to the operative position shown in Fig. 1, the web portion 19$^c$ of the belts will be centrally disposed over shoulders 3$^b$. In the operative position the reach of each belt 19 adjacent the drum 3 will be forced to assume a reentrant bight which will contact with the fabric F throughout a considerable distance on the drum. Side portion 19$^a$ will contact with that part of the fabric which conforms to the central part of the drum and will be driven thereby at the same velocity. Side portion 19$^b$ will assume a shorter path but being integral with portion 19$^a$ will be urged to travel at the same velocity. Portion 19$^c$ being of rubber material will flex between portions 19$^a$ and 19$^b$ with the result that the underlying fabric overhanging the shoulders 3$^b$ and reduced portions 3$^a$ of the drum will be smoothly formed by lateral progression over said shoulders and reduced portions without wrinkling and without scuffing of the coating on the fabric.

In order to prevent the air cylinder 20 from acting too rapidly I provide a checking mechanism such as a dash-pot 26 and piston 27. Dash-pot 26 is pivoted on lever arm 8 as at 28 and piston 27 engages a rod 29 stationarily supported from support 5. The rod 29 passes through a slot 27$^a$ in the piston 27 the effective length of which may be adjusted by a stop-screw 27$^b$. It will be understood that when air is admitted to cylinder 20 lever 8 will be raised moving belts 19 to initial contact with the fabric on drum 3, the slot 27$^a$ will allow such movement without bringing dash-pot 26 into action. At this point rod 29 will contact with the lower end of slot 27$^a$ and during further upward movement of arm 8 the dash-pot will act to retard the movement of the belts 19 toward the drum. When the air is released from cylinder 20 the slot 27$^a$ will allow the lever arm 8 to be retracted to a position at which the belts 19 will be raised out of contact with the drum 3 without the dash-pot 26 interfering with the retractive movement. Dash-pot 26 is provided with a by-pass 26$^a$ and an adjusting screw 31 by means of which the fluid contained in the dash-pot may pass around the piston during movement of the piston and the checking effect may be regulated.

To provide automatic positive retraction of the forming devices I provide a tension spring 30, one end of which is fastened to the stationary support 5, the other end being fastened to the end of lever-arm 8. On release of the air pressure in cylinder 20, the spring 30 which has been stretched in the upward movement of lever-arm 8 will return the parts to the position shown in Fig. 2.

As previously mentioned pulleys 16 are provided with loose rings 18 mounted thereon. These engage the grooved under side of the belts 19 and prevent the belts from being displaced from the pulleys. As they engage the part 19ᶜ of the belts which part travels at a greater velocity than the under side of parts 19ᵃ and 19ᵇ the method of mounting the rings assures rolling contact without frictional drag on the belts.

The operation of the device is as follows:

The operator applies the required number of plies of sheet material from a suitable source of supply to the drum 3. These plies of fabric will conform to the cylindrical portion of the drum and their edges will extend above the reduced shoulder portions as shown in Fig. 4. The operator now operates the air valve 25 admitting air under pressure to cylinder 20. Through levers 8, 9, and 9′ the belts 19 will be advanced toward the drum until their unsupported reaches adjacent thereto contact with the fabric F. The drum is being revolved in the direction indicated by the arrow and the parts 19ᵃ of the belts 19 contacting with the supported portion of the fabric F will be driven thereby. At this point the dash-pot 26 will come into action to prevent too rapid movement of the arms 9 and 9′ toward the drum. During further movement of arms 9, 9′, the reaches of the belt 19 in contact with the fabric F will assume reentrant arcs of contact with the drum, the parts 19ᵃ of the belt will continue to drive the belts whereas portions 19ᶜ being flexible will allow portions 19ᵇ to advance toward the shouldered reduced portion 3ᵃ of the drum at the same time progressively shaping the fabric thereto in a lateral direction as indicated in Figs. 4 and 5. The operator then releases the air from cylinder 20 and due to the slot 27ᵃ the mechanism will be retracted from the drum 3 by spring 30 without interference of the dash-pot mechanism until the belts 19 have ceased contacting with the drum, whereupon the dash-pot will check the velocity of the mechanism until the apparatus has returned to the position shown in Fig. 2.

The beads may now be applied in any desired manner and the tire completed. While I have described the invention as used in the underbead operation, it will be apparent that the same device may be used after the beads are applied if desired, for applying rolling pressure to other parts of the tire.

I claim:

1. Apparatus for shaping sheet material, said apparatus comprising a revoluble form for supporting said material, an orbital elastic belt having an unbacked reach thereof adapted to engage the material on the form, and means for effecting laterally progressive contacting engagement between the belt and the material on the form to progressively shape the material to the form.

2. Apparatus for shaping sheet material, said apparatus comprising a revoluble form having a material supporting surface and a reduced shouldered portion, an orbital elastic belt having an unbacked reach thereof adapted to engage the material on said supporting surface, and means for effecting laterally progressive contacting engagement between the belt and the material on the form to progressively shape the material to the shouldered portion of the form.

3. Apparatus for shaping sheet material, said apparatus comprising a revoluble form having a material supporting surface and reduced shouldered portions, a pair of orbital elastic belts each having an unbacked reach thereof adapted to engage the material on said supporting surface, and means for effecting laterally progressive contacting engagement between said belts and the material on the form to progressively and simultaneously shape the material to the shouldered portions of the form.

4. Apparatus for shaping sheet material, said apparatus comprising a revoluble form having a material supporting surface and a reduced shoulder portion, an orbital elastic belt having a portion adapted to engage the material on the supporting surface and an integral portion adapted to shape said material to said shoulder portion, and means for effecting a laterally progressive contacting engagement between the belt and said material to progressively shape the material to said shoulder portion.

5. Apparatus for shaping sheet material, said apparatus comprising a revoluble form having a material supporting surface and a reduced shoulder portion, an elastic belt channeled to provide a clamping edge portion, a shoulder forming edge portion and a connecting web portion, means for effecting relative radial pressure between said belt and said drum for causing an arcuate engagement thereof, and means for advancing the members while so engaged for shaping the material about said shoulder portion.

6. Apparatus for shaping sheet material, said apparatus comprising a revoluble stepped form, means for rotating the form, an elastic belt adapted to be driven by contact with material on the form, means for advancing the belt into contacting relation with the material on one step of the form, and means carried by the belt for effecting the shaping of material to another step of the form.

7. Apparatus for shaping sheet material, said apparatus comprising a revoluble stepped form, means for rotating the form, an elastic belt adapted to be driven by contact with material on the form, means for advancing the belt into contacting relation with the material on the form, means for retarding said advance, and means carried by the belt for effecting the shaping of material to a reduced portion of the form.

8. Apparatus for shaping sheet material to a revoluble stepped form, said apparatus comprising a stepped form, an elastic endless belt having one edge portion adapted to engage material on one of the steps of said form in an arcuate reentrant reach, and a laterally adjacent portion adapted to simultaneously engage another step of the form in tangential relation thereto, and means for holding said form and said belt in cooperative relation.

In witness whereof I have hereunto set my hand this 9th day of September, 1930.

ROBERT MAYNE.